Figure 4:
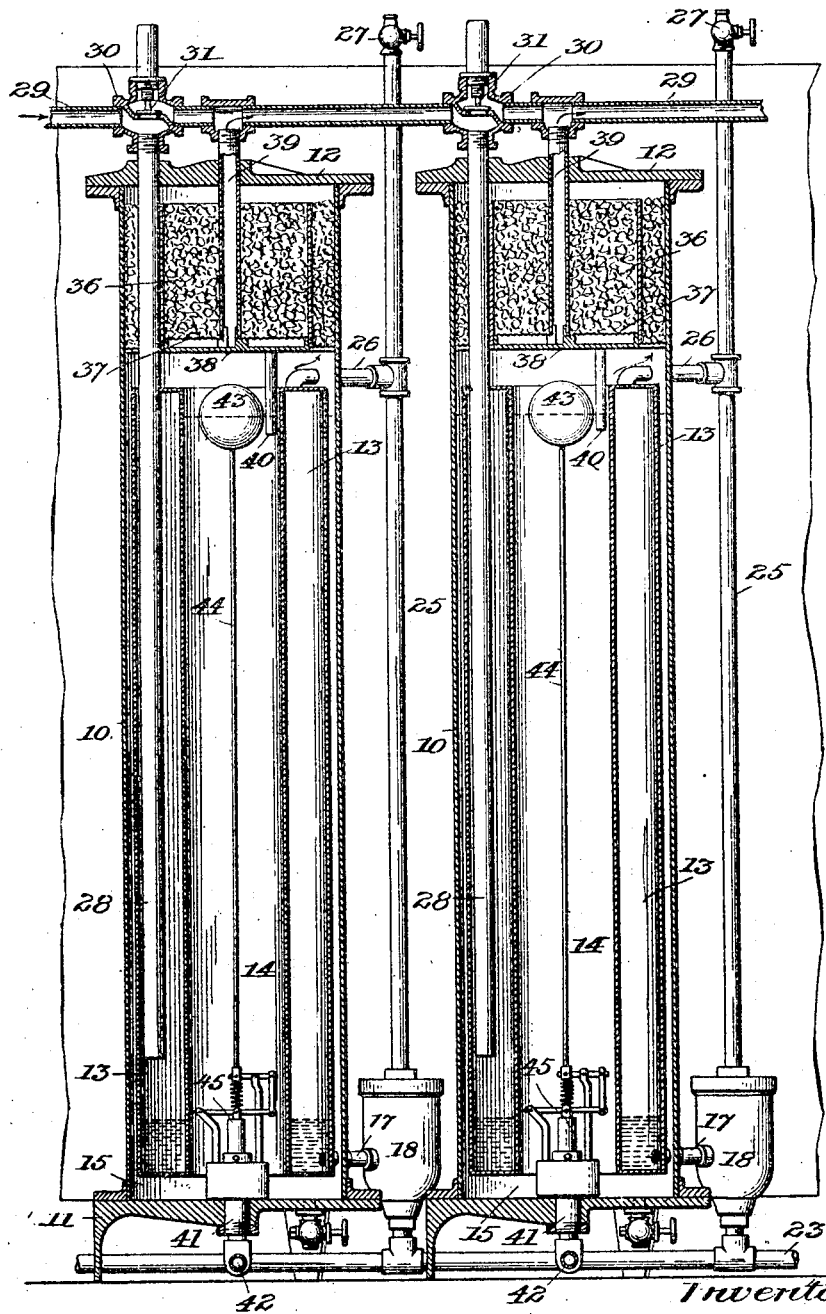

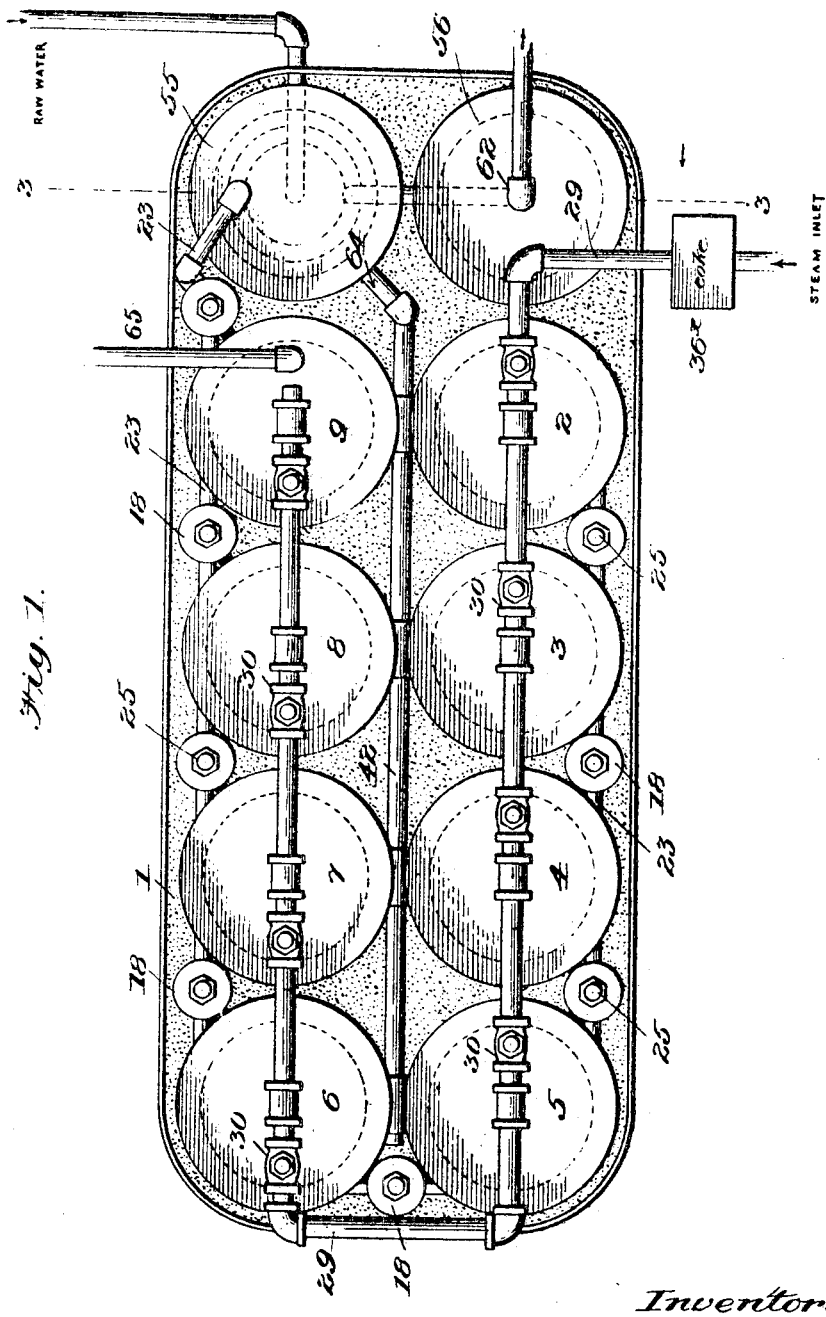

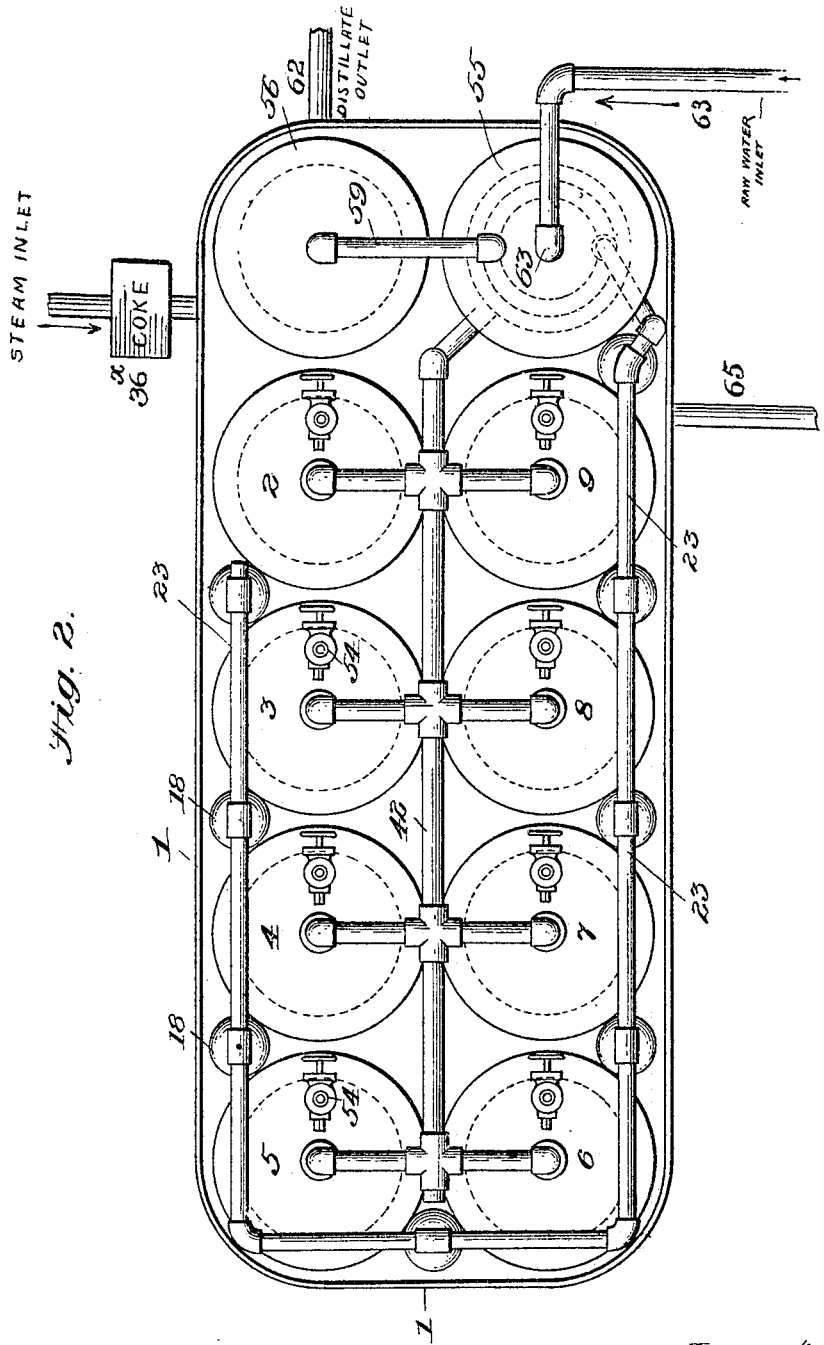

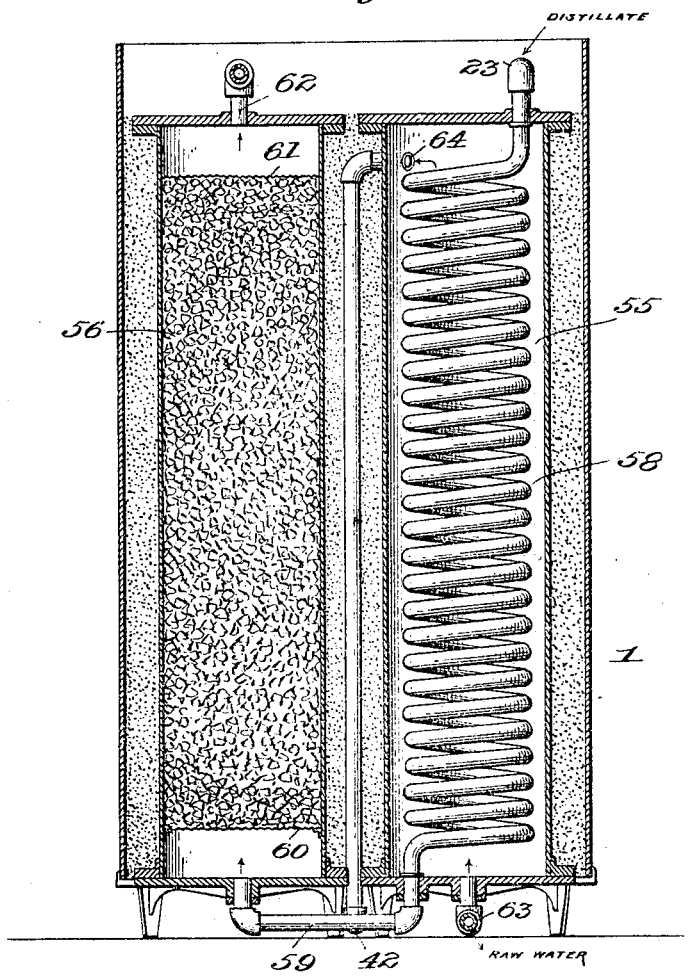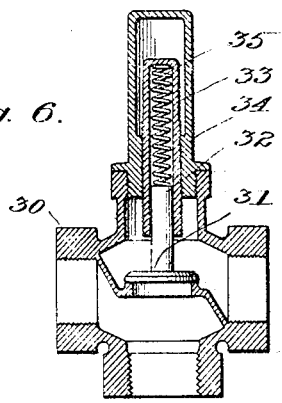

No. 799,003. PATENTED SEPT. 5, 1905.
H. F. HODGES & J. KUEN.
APPARATUS FOR PURIFYING WATER BY DISTILLATION.
APPLICATION FILED MAR. 14, 1902.

6 SHEETS—SHEET 4.

Witnesses:
Jno. F. Cross
Chas. K. Bennett

Inventors.
Horace F. Hodges
and Joseph Kuen.
by Horace Pettit
their Attorney.

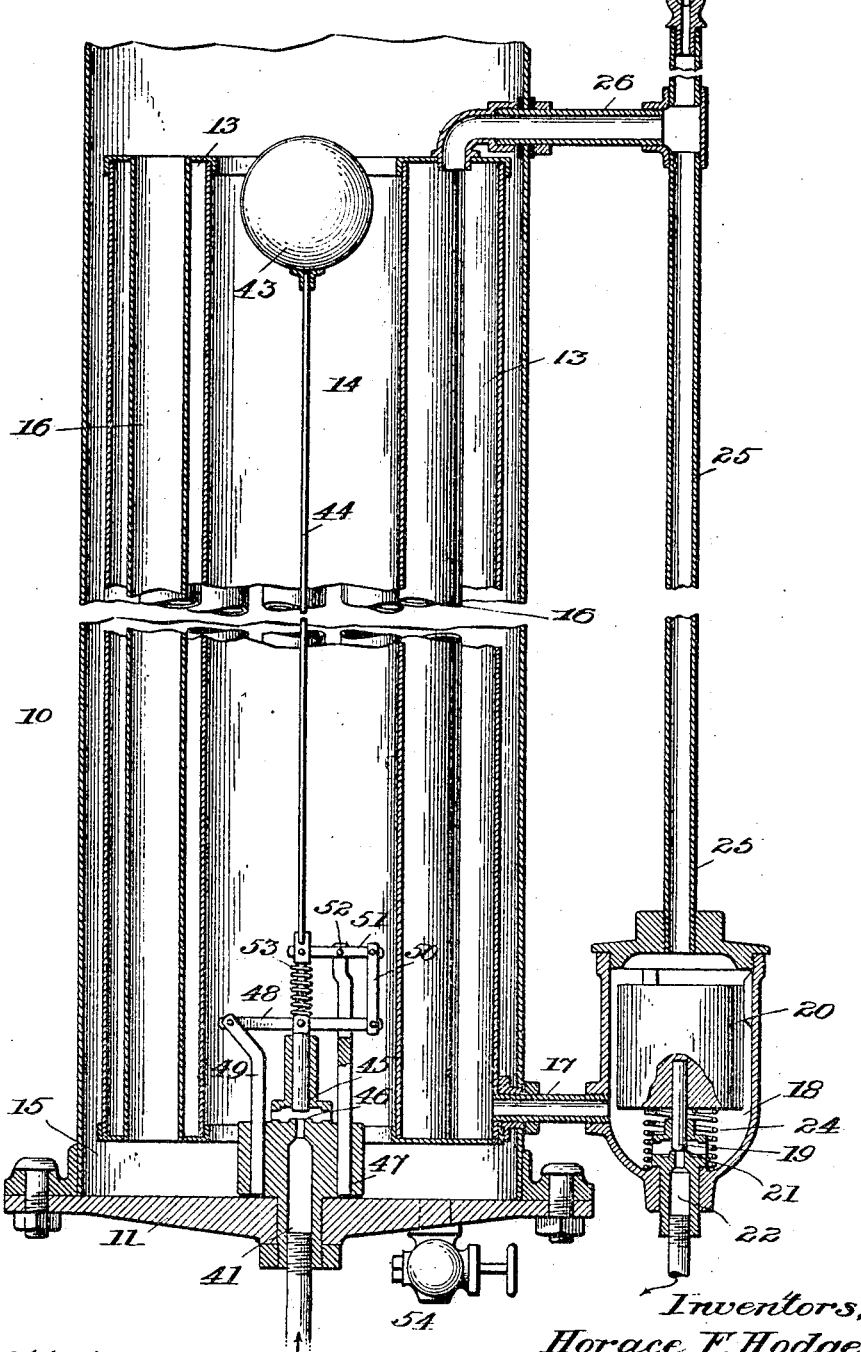

No. 799,003. PATENTED SEPT. 5, 1905.
H. F. HODGES & J. KUEN.
APPARATUS FOR PURIFYING WATER BY DISTILLATION.
APPLICATION FILED MAR. 14, 1902.
6 SHEETS—SHEET 6.
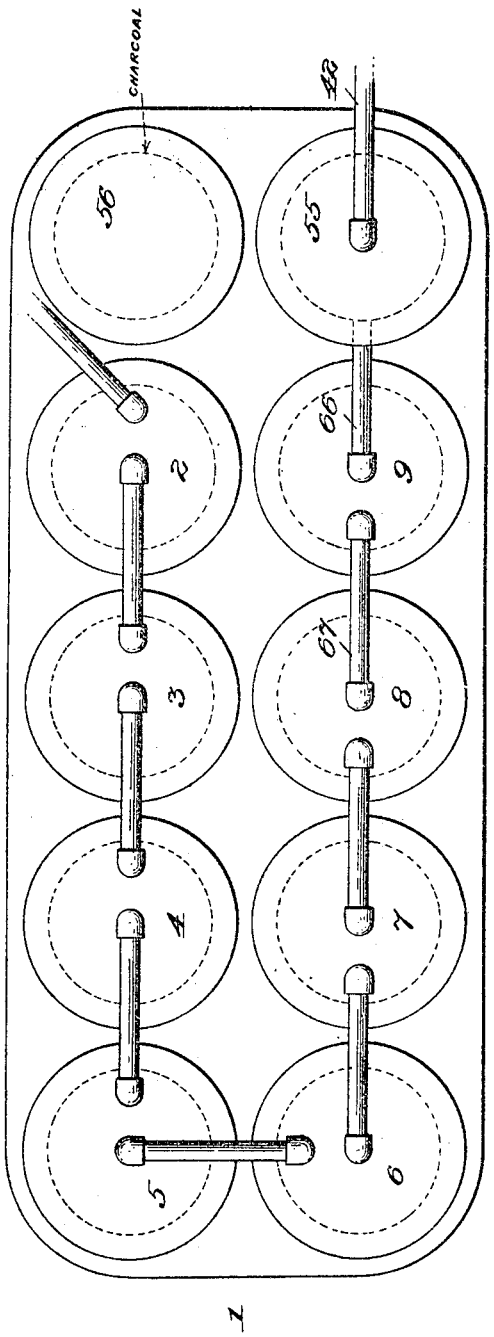
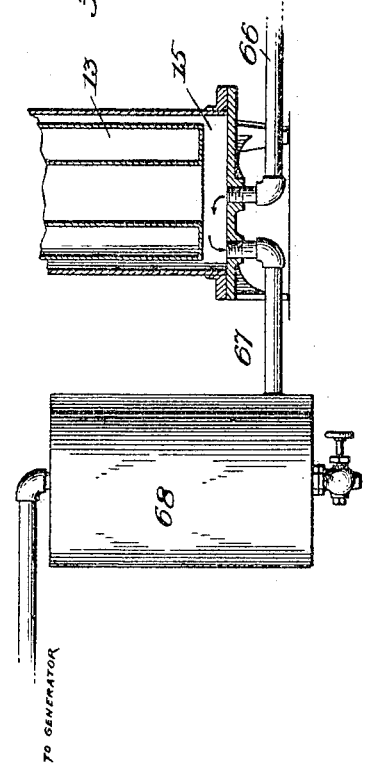
Witnesses.
Jno. T. Cross
Jos. F. Bennett
Inventors,
Horace F. Hodges,
and Joseph Kuen,
by Horace Pettit
their Attorney.

UNITED STATES PATENT OFFICE.

HORACE F. HODGES AND JOSEPH KUEN, OF PHILADELPHIA, PENNSYLVANIA, ASSIGNORS TO AMERICAN WATER PURIFYING COMPANY, A CORPORATION OF DELAWARE.

APPARATUS FOR PURIFYING WATER BY DISTILLATION.

No. 799,003.     Specification of Letters Patent.     Patented Sept. 5, 1905.

Application filed March 14, 1902. Serial No. 98,203.

*To all whom it may concern:*

Be it known that we, HORACE F. HODGES and JOSEPH KUEN, citizens of the United States, and residents of the city of Philadelphia, State of Pennsylvania, have invented certain new and useful Improvements in Apparatus for Purifying Water by Distillation, of which the following is a full, clear, and exact description, reference being had to the accompanying drawings, forming part of this specification.

This invention has relation to an improved apparatus for treating and purifying water, primarily by distillation, in the manner hereinafter fully set forth.

The principal object of this invention is to provide an improved means for distilling and purifying water whereby it is entirely relieved from all impurities either of a solid, liquid, or gaseous nature and at the same time relieved of that flat or bitter taste ordinarily found in distilled waters and becomes possessed of properties and qualities rendering it sweet and palatable.

A further object of our invention is to provide a distilling apparatus in what might be termed "multiple effect" or, in other words, having a plurality of working cells, each cell performing the function of condensing steam admitted thereto and generating new steam to be transferred to the next succeeding cell, the said cell being so constructed and arranged as to enable us to utilize a primary body of heat for operating them and utilizing such heat to its fullest extent, thereby decreasing the consumption of fuel and very materially reducing the cost of distillation over existing processes.

A further object of our invention is to provide means for reinforcing the volume and temperature of the steam in the succeeding cells, so that the heat lost by unavoidable radiation will be compensated for, thus enabling us to increase the number of multiplied effects or, in other words, to materially increase the number of working cells in the apparatus without proportionately increasing the amount of fuel used.

Further objects, uses, and advantages will be apparent on reference to the following description when taken in connection with the accompanying drawings.

Referring particularly to the drawings, Figure 1 is a top plan view of an apparatus embodying our invention. Fig. 2 is a bottom view of the same. Fig. 3 is a sectional elevation taken about on the line 3 3 of Fig. 1. Fig. 4 is a sectional elevation taken through two adjoining cells of the series. Fig. 5 is an enlarged detail through one of the condensers and a portion of one of the cells, illustrating the automatic valve for controlling the withdrawal of the distillate, also the float-valve for admitting raw water into the cells. Fig. 6 is a detail section through one of the check-valves located in the steam-main between its two connections with each cell. Fig. 7 is a bottom plan illustrating a slight modification in the manner of feeding the water to the cells. Fig. 8 is a detail view illustrating the lower portion of this last cell of the series and its raw-water connections.

In carrying out our invention we provide an outer casing 1, which is preferably provided on its inner wall with a suitable insulating material. Inside of this casing are located a number of subgenerators or cells as 2, 3, 4, 5, 6, 7, 8, and 9, arranged in this instance in two rows, as illustrated in Figs. 1 and 2 of the drawings. Each of these cells comprises a cylindrical shell or casing 10, supported at its lower end on a suitable base 11 and provided at its upper end with a suitable top 12. In the interior of the cell 10 is provided a condensing-chamber 13, preferably in the form of a cylinder having a central passage 14, which forms a part of the water-chamber 15, which is adapted to entirely surround the said condenser. The condensing-chamber has passing therethrough a series of tubes 16, opening at both ends into the water-chamber, as illustrated in Fig. 5 of the drawings. Connecting with the lower portion of the condenser 13 is a duct 17, which leads to an interior chamber 18, which is provided with an automatic float-valve adapted to be operated by the rise and fall of the distillate in the condensing-chamber. This float-valve comprises a stem 19, which is secured in the float 20, the said stem 19 being adapted to normally rest upon the valve-seat 21, thereby closing the passage 22, which communicates by means of a suitable pipe with a pipe 23, which latter is common to all of the condensers in the series. The float 20 is provided with a spring 24 for supporting the same and overcoming its weight, so that it will operate to rise and open the valve at the proper time by the rising of the water in the casing 18. An equalizing-pipe 25 extends from the top of the casing 18 and is connected by means of a branch 26 with the top of the condensing-chamber 13. This pipe 25 extends above the branch 26 and is provided in its upper end with a petcock 27, which allows of the escape of gases which accumulate in the condenser, as will be hereinafter more fully described.

Extending down into the condenser 13 to a point near the bottom thereof is a pipe 28, Fig. 4, which extends up through the cell-cover and is connected with a main steam-pipe 29, which communicates with the primary generator and with each of the cells of the series in the same manner as now being described. This pipe is threaded into a pipe-fitting 30, which contains a check-valve 31 for regulating the admission of steam to the succeeding parts of the apparatus. This check-valve in this instance is provided with a stem 32, Fig. 6, which fits loosely into a hollow nipple 33, which is threaded into the casting 34. A spring 35 is interposed between the end of the stem 32 and the top of the casting 34 for exerting the necessary tension on the valve. By turning the nipple 33 the same can be adjusted so as to increase or diminish the tension of the spring 35, and thereby regulate the opening of the valve. The upper ends of the cells are provided with double-celled coke-receptacles 36, comprising an outer annular and an inner circular chamber. The outer annular chamber communicates directly with the steam-chamber below it, by which means steam may arise through it and its contained coke. The inner circular chamber is closed at the bottom and contains a horizontal screen 37, raised a little therefrom, upon which the coke rests, so that steam after passing upwardly through the outer annular chamber may pass downwardly to the small space below the raised screen. From the center of this bottom screen is a vertically-arranged pipe 39, open at its bottom and in communication with the space in the bottom of the said central coke-chamber, and the upper end of the said pipe 39 extends through the top plate 12 and is connected by means of a suitable coupling to the steam-main 29 to one side of the check-valve heretofore described. A drip-pipe 40 is secured in the bottom of the central coke-chamber and enters the central passage 14 of the condensing-chamber below the water therein, so that any condensation which collects in the coke-chamber will be carried back into the water-chamber.

In the lower portion of each of the cells is a water-inlet 41, which communicates with the water-chamber of each cell and also with a pipe 42, which is common to all of the cells. An automatic valve 45 is provided for this water-inlet, which is adapted to be operated by a float 43, which is connected by means of stem 44 with said valve. This valve 45 is adapted to close the passage and shut off the incoming water when the said water has reached a height sufficient to raise the float 43. In this instance the valve is in the shape of a round stem adapted to slide in a sleeve or guide formed in the casting 47, and its upper end is pivoted to a horizontally-disposed lever 48, Fig. 5, fulcrumed at one end to a post 49, supported on the casting 47. The other end of the lever 48 is pivotally connected by means of a link 50 to a lever 51, which is fulcrumed to a post 52, supported in the casting 47. The other end of the lever 51 is pivotally connected to the end of the float stem or rod 44. A spring 53 is interposed between the lower end of the rod 44 and the central portion of the lever 48, which serves to maintain the levers in their proper relation and also supports a portion of the weight of the float 43. The bottom of each water-chamber is provided with a wash-out valve 54, in order that the said chambers may be properly cleansed of precipitated sediment and accumulated dirt.

At the ends of the rows of cells or subgenerators we provide a cell 55 and a cell 56, as shown in the plan views of the drawings, and which are illustrated in detail in Fig. 3. The cell 55, which is in reality the first cell of the series, is provided in its interior with a coil of pipe 58, which extends at one end through the bottom of the cell and at its other end through the top of the said cell. The upper projecting end of the coil 58 is connected with the pipe 23, which is common to all of the condensers in the apparatus, as heretofore described, and the lower end of said coil is connected by means of the pipe 59 with the cell 56. This cell 56 is provided with a screen partition 60 a short distance above its bottom, and the remainder of the cell to within a short distance of its top is filled with a purifying material, such as wood-charcoal, and a screen 61 is preferably placed on top of the charcoal, as illustrated in Fig. 3. An outlet 62 is provided in the top of the cell 56, through which the distillate may be passed to any suitable point.

In the lower portion of the cell 55 is provided an inlet 63, which is connected with the raw-water-supply pipe supplying the water to be purified. The incoming water passes up through the cell 55 and through an outlet 64 to the pipe 42, which is common to all of the cells of the series and in communication with the water-chamber surrounding the condensers in each cell. Extending from the upper end of the last working cell of the series is a pipe 65, which communicates with the primary generator or other device which may utilize the heat remaining in the steam or water of the last cell.

In operation steam is first conducted from a primary generator, which may be of any well-known construction, through the main 29, Fig. 4, to the pipe 28, through which it is admitted to the bottom or lower portion of the condenser 13, located in cell 2, which is the first subgenerator of the series. The water-chamber 15, which is filled with water to the proper height and entirely surrounds the condenser, serves to condense the steam entering said condenser, while the heat contained in said incoming steam will cause the water in the surrounding chamber to evaporate into new steam of a less pressure, which passes up through the coke-chamber or through the coke surrounding the main coke-chamber and then down to the bottom of the chamber 36, where it enters the pipe 39 and passes through the main 29 to the pipe 28 of the next succeeding cell. The operation in this cell is substantially the same as that described in the first, and the new steam generated therein will pass off through the main 29 into the next cell, and so on until the steam has become so reduced in pressure and temperature as to be insufficient to evaporate the water surrounding the condenser of the last cell of the series. The water in this last cell will, however, become heated to a high temperature, and this water is conveyed through the medium of the pipe 65 to the primary generator, so that the heat therein contained may be utilized in generating the first body of steam and thus saved. The heat of the steam in the inner or condensing chambers 13 will pass through the walls of said chamber and enter the surrounding water at a rate depending upon the differences in temperature between the said water and steam, and the second body of steam formed in the water-chamber will be at a temperature and pressure slightly below that of the first body of steam. This will be true in the second cell of the series, and the steam generated therein will be further slightly reduced in temperature and pressure, and so on in all of the subgenerators of the series until the steam does not contain sufficient heat to generate new steam. A certain amount of heat is also lost by radiation, and in order to maintain a fixed difference in temperature between the cells, so that an excessive fall of temperature and pressure shall not take place, the steam-main 29 is connected with all of the cells of the series, as heretofore described, each cell having two connections—namely, the pipe 28 and the pipe 39—the first entering the condenser and the second entering above the water-space surrounding said condenser. The valve 31, Fig. 6, which is located in the main 29 between the pipes connecting with each cell, can be regulated by adjusting the tension of the spring 33, so that any fixed amount of pressure will serve to open said valve, which amount can be varied or regulated at will. It will be observed that the pressure existing in the main beyond the said valve will be less than the pressure in advance of said valve by the amount necessary to open the said valve, and should the pressure fall below that difference the valve will open automatically and admit steam to maintain the required secondary pressure. The pressure in the water-chamber surrounding the condenser will correspond to this secondary pressure by reason of its connection with the main, thus establishing the required difference of pressure and temperature between the condenser and its surrounding water-chamber. As before stated, by varying the resistance of this valve 31 the difference in temperature can be regulated at will. The steam in the main is admitted in a like manner to the condenser of the second cell, and passing through the second valve is further reduced, this valve serving to maintain a fixed relation of pressure in the second water-chamber, and so on to the end of the series. For example, say the entry of steam into the condenser of cell 2 is 250° Fahrenheit and the fixed difference in temperature between the steam in the condenser and the steam in the water-chamber is 5°, and the check-valve is regulated so as to maintain this fixed difference, so that in the event of the temperature in the main beyond the valve dropping below 245° Fahrenheit the check-valve will open and this portion of the main will be reinforced by the steam from the primary generator until it reaches the required temperature and pressure, when the check-valve will immediately close. The main being in connection with the condenser of cell No. 3, or the second cell of the series, steam will be admitted at 245° Fahrenheit, while the steam in the water-chamber surrounding this condenser should be 240° Fahrenheit, and if it falls below this temperature the check-valve for this cell will open and reinforce it until it reaches the required temperature of 240° Fahrenheit, when it will again close, as in the first instance, and so on until the last cell is reached when, according to these figures, the steam entering the condenser in that cell will have been reduced to 215° Fahrenheit or to a point insufficient to further generate steam in its surrounding water-chamber. The heated water in this chamber may be then piped off and conveyed to the primary generator for the purpose, as before described, of utilizing its heat in the generation of the first body of steam. It is obvious that our apparatus is not limited to this range of temperature and corresponding pressures, for any range of temperature and pressure may be utilized depending on the pressure in the primary steam-generator and upon the number of cells. The steam generated in the last cell of the series may be used for power or other purposes, in which case the reduction in pressure and temperature between the first and last cell will represent the heat used in the distilling or purifying process. The water of condensation, or distillate, will accumulate in the bottom of each condenser to a certain level and will be drawn off through the medium of the automatic-valve mechanism in the chamber 18 and carried to the cooling-cell 55 by means of the pipe 23, which is common to all of the condensers. The steam entering each condenser through the pipe 28 will strike against the surface of the accumulated distillate and serve to keep it at or near the boiling-point, thereby preventing its absorbing any noxious gases which the said steam may contain. Any gases which may be present in the incoming steam will, therefore, not be absorbed by the distillate, but will be driven to the upper portion of the condenser, where they will escape through the medium of the branch pipe 33 and the pipe 31 to the atmosphere, the petcock 32 being provided on the end of this pipe 31 for the purpose of allowing the gases to escape. The distillate, which is conveyed to the cooling-cell 55 and passes from the top thereof through the coil 58, will be cooled by the incoming raw water which passes up through this cell entirely surrounding the said coil and escapes through the outlet 64, so that when the said distillate reaches the charcoal-cell 56 it will be comparatively cool. The water after passing through the charcoal will be absolutely pure and possess a sweet and palatable taste. The incoming raw water in passing upwardly through the cell 55, Fig. 3, and around the coil 58 absorbs the heat from the distillate in said coil, so that it is delivered through the common pipe 42 to each of the water-chambers in the various cells in a heated condition, and the amount of heat necessary to evaporate this water will be decreased. As soon as these water-chambers in the respective cells are filled to the required height the float-valve 43 will rise, which action tilts the lever 51 and through the medium of the link 50, Fig. 5, causes the lever 48, which carries the valve 45, to move downwardly and close the valve and shut off the incoming water. By this means the required water-level is always maintained in the water-chambers surrounding each condenser. The initial steam as it comes from the primary generator passes through a coke-chamber 36ˣ, Fig. 4, which may be connected to the pipe 29 at any suitable point in advance of its connection with the pipe 28 of the first cell of the series. Any entrained water and gases which are generated at high temperature are condensed and held back in passing through this bed of coke. Each of the cells is, as before described, provided with coke-chambers in its upper portion through which the new steam generated in each cell must pass before it enters the condenser of the next succeeding cell for the same purpose as before described.

The space between the different cells inside of the outer casing 1 must be filled with a suitable insulating material, so as to prevent as far as possible the escape of heat from these cells by external radiation.

From the foregoing description it will be seen that we have provided means for utilizing the heat from the primary source to its very fullest extent and greatly decreasing the consumption of fuel used, and therefore very materially diminishing the cost of the product.

In our preferred form of apparatus we have described and shown the raw-water pipes as being common to all of the cells of the system or, in other words, connected thereto in parallel. This is not essential, as this water might be introduced through pipes in series in the manner illustrated in Figs. 7 and 8 of the drawings. In this construction the raw water from the coil-cell 55 will enter one cell of the series through a pipe 66, which is provided at its inlet to each of the water-chambers with the automatic valve similar to 30, heretofore described, and will pass out through the pipe 67 and be connected to the next cell in a similar manner, and so on to each cell of the series. After it leaves the last cell it may pass into a mud-drum 68, which will collect any sediment which may be contained therein, and from thence it is conducted back to the primary generator. The only advantage in this system of piping the incoming water is that the water-chambers in each of the cells are continually flushed for the purpose of cleaning out the sediment which may collect therein. This arrangement would do away with the necessity for a wash-out valve, such as 54, shown when the other system of piping is used.

It must be understood we do not wish to confine ourselves to the details of construction herein shown and described, as various changes can be made in many working parts of our apparatus without departing from the spirit and scope of our invention.

Having thus described our invention, what we claim, and desire to secure by Letters Patent, is—

1. In a distilling apparatus, a plurality of cells comprising two chambers constituting generators and condensers, pipe connections between each generator and its succeeding condenser in an adjacent cell, means for supplying heat to the first generator, and automatic means for reinforcing the pressure in each generator to maintain constant differences of pressure between successive generators, and to compensate for variable loss of heat due to radiation.

2. In a distilling apparatus, a plurality of generators arranged in series, condensers in thermal contact therewith, pipe connections between each generator and its succeeding condenser, and automatic valves included in said connections for reinforcing the pressure in each generator to maintain constant differences of pressure between successive generators and to compensate for variable loss of heat due to radiation.

3. In a distilling apparatus, a plurality of successive generators and condensers, a condenser and a generator constituting a single cell, connections between the generator of one cell and the condenser of the next, and automatic means for reinforcing the pressure in each generator to maintain constant differences of pressure between succeeding generators, and to compensate for variable loss of heat due to radiation.

4. In a distilling apparatus, the combination with a primary generator, of a plurality of subgenerators and condensers, pipe connections between the primary generator and one of the condensers, connections between each subgenerator and its succeeding condenser, and automatic means for reinforcing and maintaining constant differences of pressure between each succeeding subgenerator, and to compensate for variable loss of heat due to radiation.

5. In a distilling apparatus, the combination of a primary generator, a plurality of subgenerators and condensers, connections between the primary generator and the first condenser, connections between each subgenerator and its succeeding condenser, and automatic means included in said last-named connections for reinforcing the pressure in each subgenerator to compensate for variable loss of heat due to radiation.

6. In a distilling apparatus, the combination of a primary generator, a plurality of subgenerators and condensers, a steam connection between the primary generator and the first condenser, connections between each subgenerator and its succeeding condenser, and an automatic valve included in said last-named connections for admitting steam directly from each subgenerator to the next succeeding generator for reinforcing the pressure in the latter to maintain constant pressure therein, and to compensate for variable loss of heat due to radiation.

7. In a distilling apparatus, the combination of a primary generator, a plurality of subgenerators and condensers, connections between the primary generator and all of the subgenerators, automatic valves included in said connections for each subgenerator, for reinforcing the pressure in said subgenerators to compensate for variable loss of heat due to radiation.

8. In a distilling apparatus, the combination of a primary generator, a plurality of subgenerators and condensers, a pipe connection between the primary generator and all of the subgenerators, automatic valves included in said pipe connection between each subgenerator for reinforcing the pressure in each subgenerator to compensate for variable loss of heat due to radiation, and connections between said pipe connection and each condenser.

9. In a distilling apparatus, the combination of a primary generator, a plurality of subgenerators and condensers, one condenser and one generator forming a single cell, a main pipe connection between said primary generator and having branches entering each of said subgenerators, and also having other branches entering each condenser, and automatic valves included in said pipe connection between the branches entering the generator and condenser respectively of each cell for reinforcing the pressure in each subgenerator to compensate for variable loss of heat due to radiation.

10. In a distilling apparatus, a cell having a generating-chamber and a condensing-chamber, means for admitting steam to the condensing-chamber, said means comprising a conduit so arranged as to cause the incoming steam to be impinged upon the surface of the distillate in the condensing-chamber for preventing the latter from absorbing gases liberated during evaporation.

11. In a distilling apparatus, a cell having a generating-chamber and a condensing-chamber, means for admitting steam to the condensing-chamber, said means comprising a conduit so arranged as to cause the incoming steam to be impinged upon the surface of the distillate in the condensing-chamber for preventing the distillate from absorbing gases liberated during evaporation, and means for conducting away said gases.

12. The combination of a plurality of subgenerators, a water-chamber in each subgenerator, means for admitting water to the same, a condensing-chamber in the water-chamber, means for admitting steam thereto, a vent-pipe leading from the condenser, and means for preventing the distillate from reabsorbing said gases, substantially as described.

13. The combination of a primary generator, a plurality of subgenerators arranged in series, means for condensing steam therein, means for controlling the height of the water of condensation, and an introductory steam-inlet adapted to deliver steam on the surface of the accumulated distillate, for the purpose described.

14. The combination of a primary generator, subgenerators arranged in series, internal steam-condensing chambers in the subgenerators, means for regulating the height of the accumulated distillate in the lower part of the condenser, and a steam connection entering the condenser to a point close to the level of the distillate for the purpose described.

15. The combination of a plurality of subgenerating-cells, internal steam-condensing chambers in said cells, means for controlling the level of the accumulated distillate in the condensers, a steam-supply pipe entering the condensers slightly above the surface of the accumulated distillate and vents provided in the condensers for the escape of liberated gases, substantially as described.

16. In a distilling apparatus, a subgenerating-cell comprising a water-chamber, means for automatically feeding the said water-chamber and maintaining a certain level therein, a condensing-chamber in the water-chamber, a steam-pipe entering said condensing-chamber to a point near the bottom thereof, means for withdrawing the accumulated distillate, and an automatic valve for maintaining a level of the distillate slightly below the end of the steam-inlet pipe, substantially as described.

17. In a distilling apparatus, a subgenerating-cell comprising a water-chamber, a water-inlet provided in the bottom thereof, an automatic valve for regulating the height of said water, a steam-space above the water-chamber, a condensing-chamber in said water-chamber, an outlet in the bottom of said chamber, a check-valve connected therewith for maintaining a certain level to the water of condensation, and a steam-inlet pipe entering said condenser and extending to a point above the water-level adapted to deliver steam upon the surface of the distillate, for the purpose described.

18. In a distilling apparatus, a subgenerating-cell comprising a water-chamber, a water-inlet provided in the bottom thereof, an automatic valve for regulating the height of said water, a steam-space above the water-chamber, a condensing-chamber in said water-chamber, an outlet in the bottom of said chamber, a check-valve connected therewith for maintaining a certain level to the water of condensation, a steam-inlet pipe entering said condenser and extending to a point above the water-level adapted to deliver steam upon the surface of the distillate, and a vent-pipe in the upper portion of the condenser for the escape of liberated gases, substantially as described.

19. In a distilling apparatus, a subgenerator comprising a water-chamber, a water-inlet therefor, a float-valve for regulating the admission of water, a condensing-chamber in said water-chamber, a steam-pipe entering said condenser to a point near the bottom thereof, an outlet in the bottom of said condenser for the escape of the distillate, a valve-casing connected with said outlet, a float-valve in said casing for maintaining a water-level slightly below the end of the steam-pipe in the condenser, and a vent-pipe connecting with the upper portion of the condenser, substantially as described.

20. In a distilling apparatus, a subgenerator comprising a water-chamber, a water-inlet therefor, a float-valve for regulating the admission of water, a condensing-chamber in said water-chamber, a steam-pipe entering said condenser to a point near the bottom thereof and an outlet in the bottom of said condenser for the escape of the distillate, a valve-casing connected with said outlet, a float-valve in said casing for maintaining a water-level slightly below the end of the steam-pipe in the condenser, a vent-pipe connecting with the upper portion of the condenser, an equalizing-pipe connecting the valve-casing and the vent-pipe, substantially as described.

21. In a distilling apparatus, the combination with a series of subgenerators, of a primary steam source for supplying one of the subgenerators, successive steam connections between the subgenerators, a receiving-cell for the raw water, means for heating the raw water in the receiving-cell, means for feeding the water so heated to each of the subgenerators in series, and a pipe for conveying the heated water from the last cell of the series to the primary steam source for the purpose of utilizing the heat contained therein, substantially as described.

22. In a distilling apparatus, the combination with a series of subgenerators, of a primary steam source for supplying one of the subgenerators, successive steam connections between the subgenerators, a receiving-cell for raw water, means for heating the raw water in the receiving-cell, means for feeding the water so heated from the receiving-cell to one of the subgenerators, and successively therefrom to each generator of the series, substantially as described.

23. In a distilling apparatus, the combination with a series of subgenerators, of a primary steam source for supplying one of the generators, successive steam connections between each of the subgenerators, a receiving-cell for raw water, means for heating the raw water in the receiving-cell, means for feeding the water so heated from the receiving-cell to one of the subgenerators and successively therefrom to each generator of the series, and a pipe for conveying the water from the last cell of the series to the primary generator, substantially as described.

24. In a water-purifying apparatus, the combination of a primary generator, a series of subgenerators, a steam connection between said primary generator and the subgenerators, a coke-chamber through which the initial steam is passed, means for condensing and generating new steam in the subgenerator, a coke-chamber in each subgenerator through which the new steam passes, and a charcoal-chamber for the distillate substantially as described.

25. A distilling-cell comprising an inner chamber adapted to be partially filled with water, a steam-space above the water-space, a coke-receptacle in said steam-space, a steam-pipe leading from the coke-chamber, a condenser supported from the inner chamber, a steam-supply pipe entering the top of said condenser and extending to a point near the bottom thereof, and adapted to deliver steam upon the surface of the distillate substantially as described.

26. A distilling-cell comprising an outer chamber adapted to be partially filled with water, a steam-space above the water-space, a coke-receptacle in said steam-space, a steam-pipe leading from the coke-chamber, a condenser supported in the outer chamber, a steam-supply entering the top of said condenser extending to a point near the bottom thereof and adapted to deliver steam upon the surface of the distillate, means for maintaining a water-level in the water-chamber, and means for maintaining a level of the water of condensation in the lower portion of the condenser slightly below the end of the steam-supply pipe, substantially as described.

27. The combination of a chamber adapted to be partially filled with water, a steam-space above the water-space, a coke-receptacle located in said steam-space, an open top in said coke-receptacle, apertures formed in the bottom of said receptacle adjacent its outer edges, a steam-pipe extending in said coke-receptacle to a point near the bottom thereof, a condenser supported in the water-chamber, and a steam-supply pipe entering said condenser, substantially as described.

28. A distilling-cell comprising a closed cylinder adapted to be partially filled with water, a steam-space above the water-space, a coke-chamber in said steam-space, a steam-pipe leading from the coke-chamber, a closed condenser supported in the water-chamber adapted to be entirely surrounded by water, an annular passage extending through said condenser, a series of water-tubes passing through the condenser and a steam-supply pipe entering the top of said condenser and extending to a point near the bottom thereof, substantially as described.

29. The combination with a series of distilling-cells, a raw-water-supply tank, a pipe connection between said tank and one of the cells of the series, and a pipe between each cell for connecting said cells in succession, whereby the said cells may be flushed out collectively for cleansing purposes, substantially as described.

30. The combination with a series of distilling-cells, a raw-water-supply tank, a pipe connection between said tank and one of the cells of the series, a pipe between each cell for connecting said cells in succession and a mud-drum connected with the outlet-pipe of the last cell of the series, for the purpose, substantially as described.

31. The combination with a series of distilling-cells, a raw-water-supply tank, a pipe connection between said tank and one of the cells of the series, a pipe between each cell for connecting said cells in succession, and an automatic valve to the inlet-pipe of each cell for supply of water, substantially as described.

In witness whereof we have hereunto set our hands this 10th day of March, A. D. 1902.

HORACE F. HODGES.
JOSEPH KUEN.

Witnesses:
ARTHUR E. NITZSCHE,
JNO. T. CROSS.